(12) United States Patent
Hoffman et al.

(10) Patent No.: US 8,359,142 B2
(45) Date of Patent: Jan. 22, 2013

(54) VARYING IRRIGATION SCHEDULING BASED ON HEIGHT OF VEGETATION

(75) Inventors: Joshua D. Hoffman, Davenport, IA (US); Noel Wayne Anderson, Fargo, ND (US); David August Johnson, Charlotte, NC (US); Russell Thacher, Fort Mill, SC (US); Kirk Eisenbeis, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/417,591

(22) Filed: Mar. 12, 2012

(65) Prior Publication Data
US 2012/0173087 A1    Jul. 5, 2012

Related U.S. Application Data

(62) Division of application No. 12/683,123, filed on Jan. 6, 2010, now Pat. No. 8,285,460.

(51) Int. Cl.
*A01G 25/09* (2006.01)
*B05B 17/00* (2006.01)
*G06F 7/00* (2006.01)
*G06F 7/70* (2006.01)
*G06F 7/76* (2006.01)

(52) U.S. Cl. .................. 701/50; 239/1; 239/DIG. 15

(58) Field of Classification Search .............. 701/50; 111/200, 900; 239/1, DIG. 15
See application file for complete search history.

(56) References Cited

U.S. PATENT DOCUMENTS

| | | | |
|---|---|---|---|
| 2,751,030 A | 6/1956 | Null | |
| 3,425,197 A | 2/1969 | Kita | |
| 3,924,389 A | 12/1975 | Kita | |
| 4,133,404 A | 1/1979 | Griffin | |
| 4,184,559 A | 1/1980 | Rass | |
| 4,573,547 A | 3/1986 | Yoshimura et al. | |
| 4,777,785 A | 10/1988 | Rafaels | |
| 4,887,415 A | 12/1989 | Martin | |
| 5,246,164 A | 9/1993 | McCann et al. | |
| 5,528,888 A | 6/1996 | Miyamoto et al. | |

(Continued)

FOREIGN PATENT DOCUMENTS

| | | |
|---|---|---|
| DE | 10349324 A1 | 5/2005 |
| EP | 1647175 A1 | 4/2006 |

(Continued)

OTHER PUBLICATIONS

"Military R-Gator", John Deere Federal & Military Sales, www.deere.com/en_US/contractsales/fedmilitarysales/cce/r_gator/r_gator.html, retrieved Oct. 16, 2009, 1 page.

(Continued)

*Primary Examiner* — Christopher J. Novosad
(74) *Attorney, Agent, or Firm* — Yee & Associates, P.C.; Jeremy J. Westlake

(57) ABSTRACT

A method of controlling application of a substance to vegetation using data obtained via a mobile machine is provided. A height of the vegetation is measured during a scheduled task of the mobile machine. The measured height of the vegetation is compared with a calculated height of the vegetation. Then, an amount of the substance applied by an irrigation system to an area containing the vegetation is adjusted based on a difference between the measured height of the vegetation and the calculated height of the vegetation.

6 Claims, 5 Drawing Sheets

U.S. PATENT DOCUMENTS

| | | |
|---|---|---|
| 6,339,735 B1 | 1/2002 | Peless et al. |
| 6,443,509 B1 | 9/2002 | Levin et al. |
| 6,880,291 B2 | 4/2005 | Raun et al. |
| 6,947,811 B2 | 9/2005 | Addink et al. |
| 7,103,451 B2 | 9/2006 | Seal et al. |
| 7,107,132 B2 | 9/2006 | Dean |
| 7,133,746 B2 | 11/2006 | Abramson et al. |
| 7,574,284 B2 | 8/2009 | Goldberg et al. |
| 2007/0188605 A1 | 8/2007 | Anderson et al. |
| 2008/0109126 A1 | 5/2008 | Sandin et al. |
| 2008/0183349 A1 | 7/2008 | Abramson et al. |
| 2011/0153338 A1 | 6/2011 | Anderson |
| 2011/0166701 A1 | 7/2011 | Thacher et al. |
| 2011/0166715 A1 | 7/2011 | Hoffman et al. |

FOREIGN PATENT DOCUMENTS

| | | |
|---|---|---|
| EP | 1933467 A2 | 6/2008 |
| WO | 0170009 A2 | 9/2001 |
| WO | 2009153304 A1 | 12/2009 |

OTHER PUBLICATIONS

"Robomow Robotic Mower", YouTube, www.youtube.com/watch?v=a17OuvxAIRs, retrieved Oct. 16, 2009, 1 page.

"iRobot Roomba 560 official video demo", YouTube, www.youtube.com/watch?v=CLIPLiQDIk0, retrieved Oct. 16, 2009, 1 page.

"Unloading on the go with AutoTrac", YouTube, www.youtube.com/watch?v=et4clJ4vtdw, retrieved Oct. 16, 2009, 1 page.

"LawnBott LB3500 Lawn Mower Review", www.lawnbottreview.com/LawnBott_LB3500_Review.html, retrieved Nov. 13, 2009, 12 pages.

"LawnBott LB3250", www.robolawn.ca/lawnbott-lb3250-super-robot-lawn-mower.cfm, retrieved Nov. 13, 2009, 3 pages.

European Search Report dated Apr. 12, 2011, regarding European Application No. 10195362.8, 5 pages.

Sanchez et al., "Fusing 3D Information for Crop/Weeds Classification," 15th International Conference on Pattern Recognition, 4:295-298, Aug. 6, 2002. (Abstract only).

VARYING IRRIGATION SCHEDULING BASED ON HEIGHT OF VEGETATION

CLAIM OF PRIORITY

This application is a Divisional of and claims the benefit of priority to U.S. patent application Ser. No. 12/683,123, filed on Jan. 6, 2010 and entitled "Varying Irrigation Scheduling Based on Height of Vegetation", the contents of which are incorporated herein by reference.

CROSS-REFERENCE TO RELATED APPLICATIONS

The present application is related to, U.S. patent application Ser. No. 12/283,205, filed on Jan. 6, 2010 and entitled "Adaptive Scheduling of a Service Robot", the contents of which are incorporated herein by reference.

FIELD OF THE INVENTION

The present invention relates generally to a mobile service robot and more particularly to a method and system for adaptively varying irrigation system scheduling based data obtained by a set of sensors located on a mobile machine that measure the height of vegetation within the operating environment of the mobile machine.

BACKGROUND OF THE INVENTION

Today, lawn mowing is considered by many to be one of the most boring and tiring routine household tasks. As a result, several mobile robotic machines have now been invented for automatically mowing lawns to save people time and effort. Navigation, obstacle avoidance, and motion control are some of the key functional components needed for safe, reliable, and accurate operation of these mobile robotic units. Typically, these mobile robots include a set of sensors that provide data for these navigation, obstacle avoidance, and motion controls.

SUMMARY

An embodiment of the present invention provides a method of controlling application of a substance to vegetation using data obtained via a mobile machine. A height of the vegetation is measured during a scheduled task of the mobile machine. The measured height of the vegetation is compared with a calculated height of the vegetation. Then, an amount of the substance applied by an irrigation system to an area containing the vegetation is adjusted based on a difference between the measured height of the vegetation and the calculated height of the vegetation.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
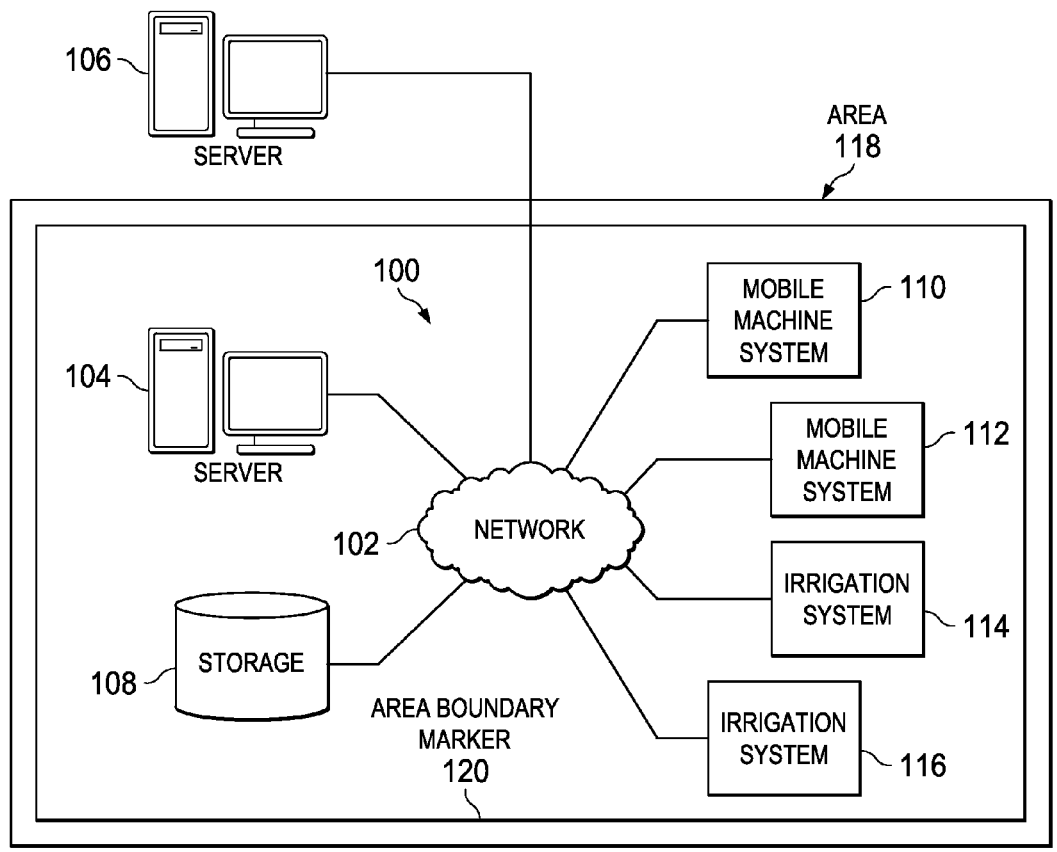
FIG. 1 is a pictorial representation of a network of data processing systems in which an illustrative embodiment may be implemented.

Illustrative embodiments of the present invention provide systems and methods for adaptive irrigation scheduling based on data obtained from sensors of a mobile service robot machine. Field robots are a superset of mobile teleoperated, supervised, and fully autonomous robots of all sizes. Service robots are smaller field robots, such as robotic lawn mowers and vacuum cleaners. These field robotic or autonomous systems, sometimes referred to as mobile robotic platforms, generally have a robotic control system that controls the operational systems of the mobile machine.

Sensor inputs to the robotic control system may include data associated with the platform's destination, preprogrammed path information, and detected obstacle information. Based on such data associated with the information above, the mobile robotic platform's movements are controlled. Obstacle detection systems within a platform may, for example, use a camera or cameras to capture images over the broad field of view, or of a particular spectrum within the field of view. For obstacle detection applications of a mobile service robot machine, the response time for collecting image data should be rapid over a wide field of view to facilitate early recognition and avoidance of obstacles.

In addition, these mobile robotic platforms also include a locomotion system, a power system, a task payload system, such as a cutting unit for lawn mowing, and a path planning system. Path planning may include point-to-point planning or area coverage planning. Area coverage may be random coverage of an area by the service robot over a predetermined period of time or may be precise area coverage with localization. Localization perception or location sensing devices for service robots may, for example, include compasses, odometers, global positioning system receivers, and vision-based triangulation systems. Further, these mobile robotic platforms also include perception for safeguarding to prevent damage to the service robot, itself, or other objects that may be present in the operating environment.

Current outdoor service robots, such as robotic lawn mowers, are configured to operate according to a manually-specified time schedule. However, during different seasons of the year or under different environmental conditions, for peak efficiency of the outdoor service robots it is necessary the user to manually modify this time schedule. Additionally, it is difficult to accurately estimate the time required for outdoor service robots to accomplish their tasks completely, which results in the user purposely over scheduling the service robot. Consequently, the service robots may experience subsequent efficiency losses and increased wear and tear.

Illustrative embodiments to overcome these scheduling shortcomings of current outdoor service robots utilize load profiling and environmental profiling. Load profiling is the continuous monitoring by the mobile service robot machine of the grass or vegetation quantity. The grass quantity is correlated to the height of grass stems and to the spatial density of the grass stems. Grass height sensors are a means of detecting the height of the grass stems and structured light sensors are a means of measuring the spatial density of the grass stems.

However, given the challenges and added cost of directly measuring grass height and/or spatial density, it may be desirable to indirectly measure grass quantity using an inexpensive and reliable sensor. Thus, illustrative embodiments utilize sensors related to the mobile service robot machine. Specifically, illustrative embodiments may use sensors to measure machine power, such as battery voltage or motor current. In addition, illustrative embodiments may use sensors for other measurable parameters, such as axle torque. From these machine related sensors, the vegetation quantity (i.e., the vegetation height and/or spatial density) can be inferred.

Environmental profiling is the continuous monitoring of environmental conditions or factors, such as rainfall, temperature, wind speed, sunlight, and soil moisture. Monitoring of these environmental conditions may either be performed directly by utilizing sensors located on the mobile service robot machine and/or the charging station to collect this environmental data or indirectly by using a network connection, such as an Internet connection, to collect this environmental data from a weather service for example. When the mobile service robot machine determines that environmental conditions are favorable for increased vegetation growth, the service robot may automatically increase the mowing task schedule to account for the environmental conditions. Conversely, the mobile service robot machine may automatically reduce the mowing task schedule during periods of low vegetation growth conditions. Additionally, the mobile service robot machine may use weather monitoring to reschedule or skip one or more tasks in the event of adverse conditions, such as heavy rainfall amounts, using either actual or predicted environmental conditions.

Further, along the lines of environmental profiling, the mowing system may by cognizant of an irrigation system schedule and adjust the irrigation schedule in response to data collected by the sensors located on the mobile service robot machine. This awareness reduces the demand for the user to manually adjust the irrigation system schedule, which may be frequent during the summer as the homeowner gauges watering needs by the color of the grass and, potentially, by wet spots in the yard. Coupling the mobile service robot machine task schedule to the irrigation schedule may also ensure that the mobile service robot machine operates during dry vegetation conditions to reduce machine load.

Thus, illustrative embodiments are capable of monitoring vegetation growth utilizing a set of sensors on the mobile service robot machine to automatically and adaptively adjust the irrigation system schedule to achieve a target vegetation growth rate. The irrigation schedule adjustments are based on the measured vegetation height or density. The vegetation height or density may be indirectly measured based, for example, on determining the power drawn by the mobile service robot machine during mowing task sessions and a standard vegetation growth model. Alternatively, the vegetation height or density may be directly measured based, for example, on data collected by one or more vegetation height sensors located on the mobile service robot machine.

As the power drawn by the mobile service robot machine drops off or the vegetation height sensors indicate that the vegetation height is less than a calculated vegetation height, the time between irrigation operations may be shortened and/or the time for irrigation operations may be increased. In addition, as the power drawn by the mobile service robot machine mounts up or the vegetation height sensors indicate that the vegetation height is greater than a calculated vegetation height, the time between irrigation operations may be extended and/or the time for irrigation operations may be decreased. An irrigation operation may, for example, include the application of a liquid substance, such as water, fertilizer, pesticide, herbicide, or any combination thereof, to the vegetation within an operating environment of the mobile service robot machine via an irrigation system.

Figure 2:
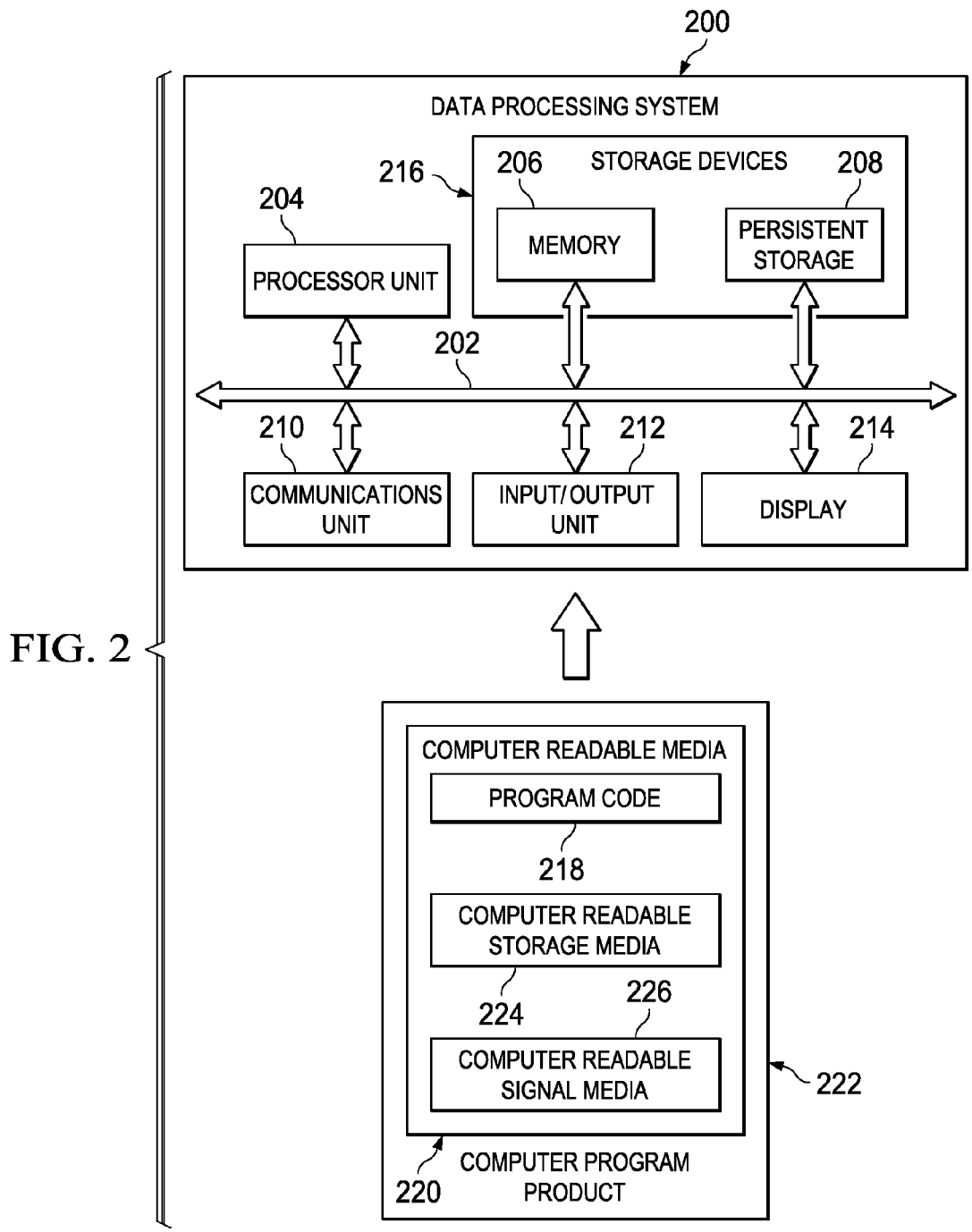
FIG. 2 is a block diagram of a data processing system in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of data processing systems and other devices in which the illustrative embodiments may be implemented. Network data processing system 100 contains network 102, which is the medium used to provide communications links between various data processing systems and other devices connected together within network data processing system 100. Network 102 may include connections, such as wire, wireless communication links, or fiber optic cables.

In the depicted example, server 104 and server 106 connect to network 102 along with storage unit 108. In addition, mobile machine system 110, mobile machine system 112, irrigation system 114, and irrigation system 116 also connect to network 102. Mobile machine system 110, mobile machine system 112, irrigation system 114, and irrigation system 116 are clients to server 104 and/or server 106 in this example.

In the depicted example, server 104 provides information, such as boot files, operating system images, and applications to mobile machine system 110, mobile machine system 112, irrigation system 114, and irrigation system 116. Server 104 may represent a local server that is located, for example, in a smart house. Server 106 may represent a remote server that is located, for example, at a service robot mower manufacturing site or a weather service site. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to mobile machine system 110 or irrigation system 114 over network 102 for use on mobile machine system 110 or irrigation system 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Mobile machine systems 110 and 112 are data processing systems that include mobile service robots for performing automatic tasks or services, such as vegetation cutting and leaf collecting, in area 118. Mobile machine system 110 and mobile machine system 112 each may include one or more mobile service robots and their associated charging stations or battery chargers. In addition, even though this illustrative example illustrates two mobile machine systems, illustrative embodiments are not restricted to such. In other words, illustrative embodiments may include more or fewer mobile machine systems to provide robotic tasks and services within area 118.

Irrigation systems 114 and 116 are data processing systems that include irrigation components for automatically applying a liquid substance, such as water, fertilizer, pesticide, fungicide, nematicide, herbicide, or any combination thereof, to vegetation within area 118. For example, chemigation is the application of fertilizer with irrigation water. Also, even though this illustrative example illustrates two irrigation systems, illustrative embodiments are not restricted to such. In other words, illustrative embodiments may include more or fewer irrigation systems to provide the application of one or more substances to vegetation growing within area 118.

In addition, irrigation system 116 may be a task payload of a mobile machine system. For example, a mobile machine system may be configured to apply water to dry areas. In other words, one mobile machine system may include a mowing task payload, while another mobile machine system may include a spot water application task payload.

Area 118 may, for example, be one or more residential lots, commercial lots, golf courses, parks, fields, or any other area of residential, commercial, recreational, or amenity land planted with grass or other vegetation. Area 118 may, for example, include one or more structures, such as houses, commercial buildings, storage sheds, and recreational equipment, and one or more parking areas, driveways, and sidewalks. Area 118 may be contiguous or non-contiguous.

In one illustrative embodiment, the vegetation in area 118 may be maintained at a low, even height. In another illustrative embodiment, the vegetation in area 118 may be maintained at different even heights. The vegetation in area 118 may, for example, include any species of grass or turf. Furthermore, area 118 containing vegetation is only one example of a mobile machine worksite. Other types of mobile machine worksites and tasks may include, but are not limited to, driveways and snow removal, lawns and leaf removal, carpets and vacuuming, hard surface floors and scrubbing, and sidewalks and ice removal.

Area boundary marker 120 marks the boundaries of area 118 for mobile machine systems 110 and 112. Mobile machine systems 110 and 112 use area boundary marker 120 to identify which portion(s) of area 118 are to have robotic task performance. Area boundary marker 120 may, for example, be an electrical wire or an optical demarcation of the boundary. Even though area boundary marker 120 is shown as a single marker in this exemplary illustration, area boundary marker 120 may include a plurality of markers. In addition, even though area boundary marker 120 is shown as having a square configuration, a user may form area boundary marker 120 in any shape or configuration necessary.

FIG. 1 is only intended as an example, and not as an architectural limitation for the different illustrative embodiments.

With reference now to FIG. 2, a block diagram of a data processing system is depicted in which an illustrative embodiment may be implemented. Data processing system 200 is an example of a data processing system, such as server 104 or mobile machine system 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
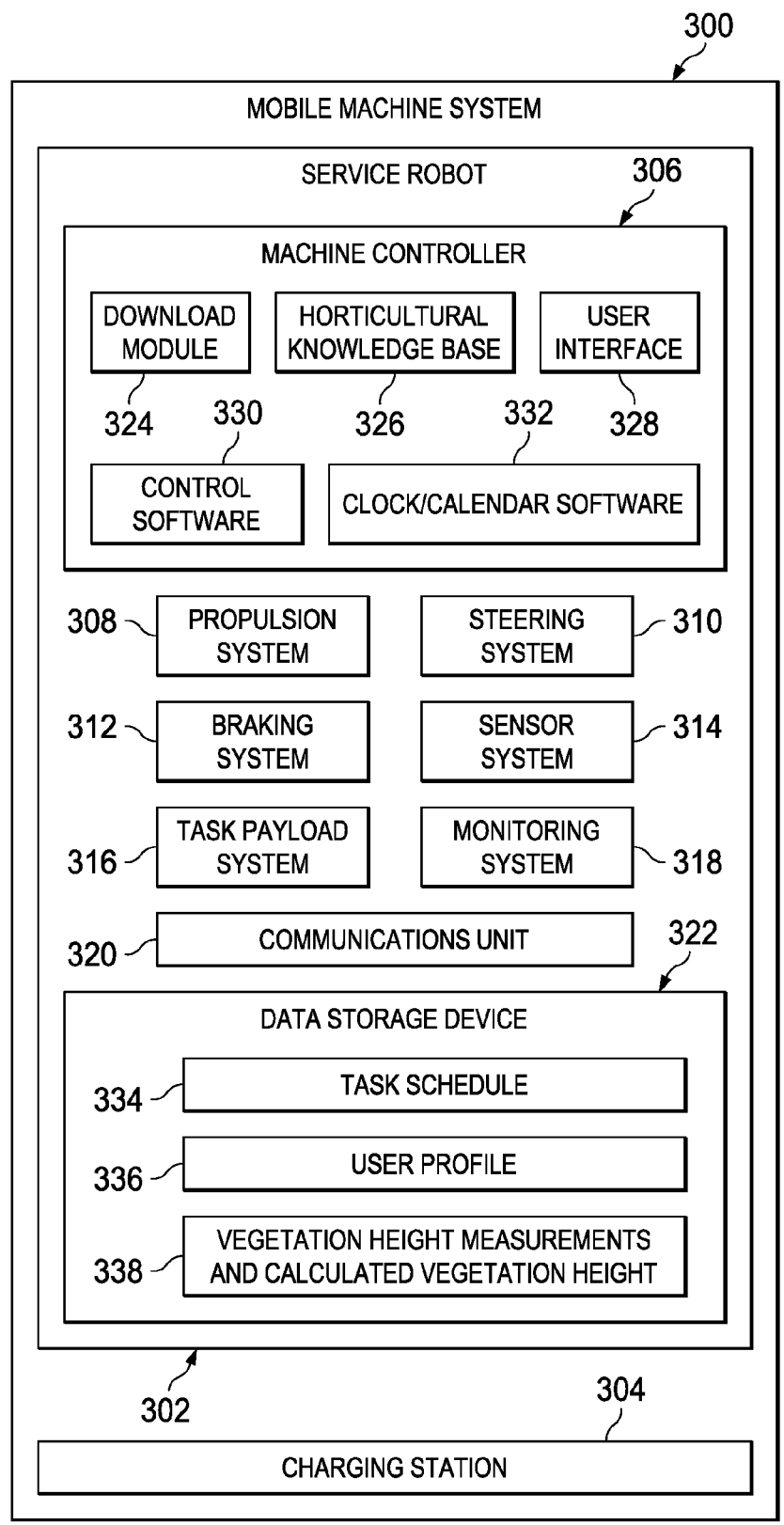
FIG. 3 is a block diagram of a mobile machine system in accordance with an illustrative embodiment.

With reference now to FIG. 3, a block diagram of mobile machine system is depicted in accordance with an illustrative embodiment. Mobile machine system 300 may, for example, be mobile machine system 110 or mobile machine system 112 in FIG. 1. However, it should be noted that mobile machine system 300 is only intended as an example of one possible implementation of a mobile machine system.

As illustrated, mobile machine system 300 includes service robot 302 and charging station 304. However, it should be noted that mobile machine system 300 may include a plurality of service robots and charging stations. Service robot 302 is a mobile service robot machine that is configured to automatically and autonomously perform one or more tasks and services in one or more designated areas, such as area 118 in FIG. 1. The one or more designated areas may, for example, be lawns, fields, golf courses, and/or other similar types of grassy areas. Also, the one or more designated areas are marked or defined by one or more markers, such as area boundary marker 120 in FIG. 1, which identify the desired areas for task performance, such as grass mowing, by service robot 302.

Charging station 304 is a base or docking station for service robot 302. Service robot 302 uses charging station 304 to recharge its power source. The power source for service robot 302 may, for example, be one or more rechargeable batteries. However, it should be noted that service robot 302 may utilize any type of rechargeable or refuelable power source for powering its various components and systems. Service robot 302 docks with charging station 304 or the fueling station when service robot 302 completes a scheduled task. In addition, service robot 302 may dock with charging station 304 to recharge or refuel its power source as needed while performing a task.

Service robot 302 includes machine controller 306, propulsion system 308, steering system 310, braking system 312, sensor system 314, task payload system 316, monitoring system 318, communications unit 320, and data storage device 322. Machine controller 306 includes download module 324, horticultural knowledge base 326, user interface 328, control software 330, and clock/calendar software 332. Machine controller 306 may, for example, be a data processing system, such as data processing system 200 in FIG. 2, or some other device that may execute instructions or processes to control functions of service robot 302. Thus, machine controller 302 may be a computer, an application integrated specific circuit, and/or some other suitable device. In addition, different types of devices and systems may be used to provide redundancy and fault tolerance.

Machine controller 306 may execute processes using control software 330 to control propulsion system 308, steering system 310, braking system 312, and sensor system 314, which direct movement of service robot 302 in the operating environment. Also, machine controller 306 may execute processes using control software 330 to control task payload system 316, which performs tasks, such as, for example, evenly cutting or mowing the vegetation growing within the designated operating environment of service robot 302.

Furthermore, machine controller 306 may execute processes using control software 330 to control monitoring system 318, which monitors the power usage of task payload system 316 during each task over time. Machine controller 306 may use this power usage data to adaptively adjust scheduling of tasks, such as mowing, based on the vegetation quantity or density. The vegetation density may be indirectly determined by the amount of power drawn by task payload system 316 during each mowing task and a known vegetation growth model.

For example, a manufacturer or a research group may determine that for a particular motor, X amount of power usage is required to cut five millimeters of a particular grass type, Y amount of power usage is required to cut ten millimeters, Z amount of power usage to cut fifteen millimeters, and so on. A manufacturer may, for example, load these calculated power usage values in the storage device at the time of manufacture or updated power usage calculations may be downloaded from a server, such as server 104 in FIG. 1. However, it should be noted that measuring power usage is only but one means of determining the grass quantity.

Machine controller 306 may send various commands to these components to operate service robot 302 in different modes of operation. These commands may take various forms depending on the implementation. For example, the commands may be analog electrical signals in which a voltage and/or current change is used to control these systems. In other implementations, the commands may take the form of data sent to the systems to initiate the desired functions or actions.

Download module 324 provides for online updates of horticultural knowledge base 326 by a network server, such as server 106 in FIG. 1. The network server may be a local network server or remote network server. In addition, download module 324 may also provide for online updates of current and future environmental data or factors from one or more local, regional, and national weather services.

Horticultural knowledge base 326 contains information about the operating environment, such as, for example, a geo-referenced map showing the landscape, structures, tree locations, flowerbed locations, individual plant locations, driveway locations, sidewalk locations, and other static object locations, such as pools, ponds, and recreational equipment. In addition, horticultural knowledge base 326 may also contain information, such as, without limitation, vegetation species located in the operating environment; information about irrigation requirements, growth stages, and life cycles of the vegetation species located in the operating environment; current weather for the operating environment; weather history for the operating environment; specific environmental features of the operating environment that affect service robot 302; and the like. It should be noted that horticultural knowledge base 326 may be located entirely in service robot 302 or parts or all of horticultural knowledge base 326 may be located in a remote location, such as storage 108 in FIG. 1, which service robot 302 may access via communications unit 320.

User interface 328 may, in one illustrative embodiment, be implemented in a display device, which is mounted on service robot 302 and viewable by a user. User interface 328 may, for example, display sensor data obtained from sensor system 314 regarding the operating environment surrounding service robot 302, as well as messages, alerts, and queries for the user. In other illustrative embodiments, user interface 328 may be implemented in a remote display device held by the user or may be implemented in a remote data processing system, such as server 104 in FIG. 1, which may be located in a smart house.

Clock/calendar software 332 is a software application that provides time and date information. In addition, clock/calendar software 332 is capable of receiving user inputs regarding scheduled appointments, activities, events, and the like. Machine controller 306 may utilize clock/calendar software 332 to factor in regular user behavioral patterns, such as the user's known work schedule, when adjusting or modifying service robot task schedule 334. The user's work schedule may be obtained from entries in the electronic calendar. Moreover, machine controller 306 may also utilize clock/calendar software 332 to factor in potential times when the yard will be in use, such as, for example, weekends, evenings, and holidays. Thus, task schedule 334 may be tailored to the most likely times the homeowner is away so that service robot 302, in essence, operates behind the scenes. Furthermore, machine controller 306 may use clock/calendar software 332 to determine when to send power up commands to service robot 302 based on task schedule 334, to determine seasons of the year for known vegetation growing models, and to determine when to adjust task schedule 334.

In these examples, propulsion system 308 propels or moves service robot 302 in response to commands from machine controller 306. Propulsion system 308 may maintain or increase the speed at which service robot 302 moves in response to instructions received from machine controller 306. Propulsion system 308 may be an electrically controlled propulsion system. In addition, propulsion system 308 may, for example, be an internal combustion engine, an internal combustion engine/electric hybrid system, an electric engine, or some other suitable propulsion system.

Steering system 310 controls the direction or steering of service robot 302 in response to commands received from machine controller 306. Steering system 310 may, for example, be an electrically controlled hydraulic steering system, an electrically driven rack and pinion steering system, an Ackerman steering system, a skid-steer steering system, a differential steering system, or some other suitable steering system.

Braking system 312 slows down and/or stops service robot 302 in response to commands from machine controller 306. Braking system 312 may be an electrically controlled braking system. In addition, braking system 312 may, for example, be a hydraulic braking system, a friction braking system, or some other suitable braking system that may be electrically controlled.

Sensor system 314 is a high integrity perception system and may be a set of sensors used to collect information about the operating environment around service robot 302. In these examples, sensor system 314 sends the collected information to machine controller 306 to provide data for identifying how service robot 302 should operate within the environment. For example, sensor system 314 may send data to machine controller 306 regarding the grass quantity within the operating environment. Sensor system 314 may determine the grass height and/or the grass spatial density of the operating environment by using, for example, a vegetation height sensor and/or a structured light sensor. In these examples, a set refers to one or more items. Thus, a set of sensors is one or more sensors in these examples.

Communication unit 320 is a high integrity communications system and may provide multiple redundant communications links and channels to machine controller 306 in order for machine controller 306 to receive information. The communication links and channels may be heterogeneous and/or homogeneous redundant components that provide fail-safe communication. This received information may, for example, include data, commands, and/or instructions.

Communication unit 320 may take various forms. For example, communication unit 320 may include a wireless communications system, such as a cellular phone system, a wireless fidelity (Wi-Fi) technology system, a Bluetooth wireless technology system, and/or some other suitable wireless communications system. Further, communication unit 320 also may include a communications port, such as, for example, a universal serial bus port, a serial interface, a parallel port interface, a network interface, and/or some other suitable port to provide a physical communications link. Communication unit 320 may be used to communicate with a user or a remote data processing system, such as a server.

Data storage device 322 is one example of persistent storage 208 in FIG. 2. Data storage device 322 includes task schedule 334, user profile 336, and vegetation height measurements and calculated vegetation height 338. Machine controller 306 uses task schedule 334 to determine when to send a command to service robot 302 to perform a task. Task schedule 334 may be a default task schedule entered by the manufacturer, a task schedule entered by the user via user interface 328, or a modified task schedule generated by machine controller 306.

User profile 336 is a file that stores information regarding the user and the user's preferences. User profile 336 may contain data, such as, for example, user name, user security password, the user's work schedule(s), which may be linked to clock/calendar software 332, time preferences for when to perform mobile robotic machine tasks, and time preferences for when not to perform mobile robotic machine tasks. Vegetation height measurements and calculated vegetation height 338 are stored measurement values that represent the height of the vegetation during previous tasks for a predetermined number of times and a calculated vegetation height measurement value for vegetation in the operating environment of service robot 302 based on known vegetation growth models. Monitoring system 318 may indirectly measure the vegetation height by monitoring power usage of task payload system 316 during a mowing task. Alternatively, sensor system 314 may directly measure the grass height by measuring the height and/or the spatial density of the vegetation.

The exemplary illustration of mobile machine system 300 in FIG. 3 is not meant to imply physical or architectural limitations on the manner in which different advantageous embodiments may be implemented. Other components in addition to or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments horticultural knowledge base 326 may be separate and distinct from mobile machine system 300, but capable of being used by mobile machine system 300.

Figure 4:
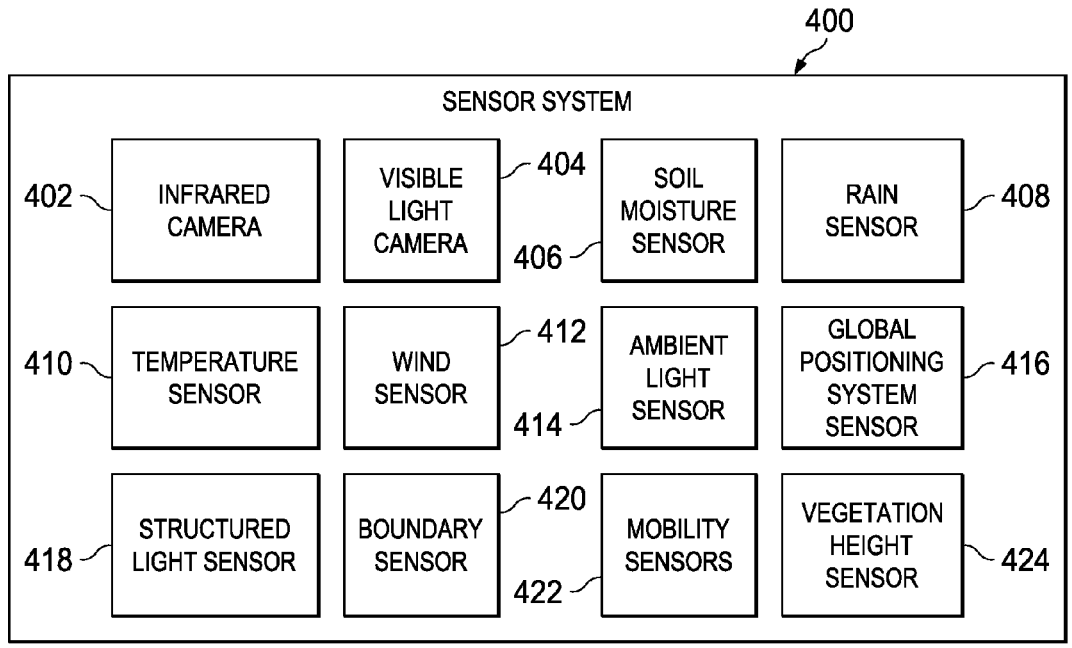
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 314 in FIG. 3.

As illustrated, sensor system 400 includes infrared camera 402, visible light camera 404, soil moisture sensor 406, rain sensor 408, temperature sensor 410, wind sensor 412, ambient light sensor 414, global positioning system (GPS) sensor 416, structured light sensor 418, boundary sensor 420, mobility sensors 422, and vegetation height sensor 424. A machine controller, such as machine controller 306 in FIG. 3, may use one or more of these different sensors to identify the operating environment around a mobile service robot machine, such as service robot 302 in FIG. 3. The machine controller may select from these different sensors in sensor system 400 such that at least one of these sensors is always capable of sensing information needed to operate the mobile service robot machine in different operating environments.

Infrared camera 402 may form an image using infrared radiation. Thus, infrared camera 402 may detect heat indicative of a living thing versus an inanimate object in the operating environment of the mobile service robot machine. Visible light camera 404 may be a standard still-image camera, which may be used alone for color information or with a second camera to generate stereoscopic, or three-dimensional, images. Infrared camera 402 and visible light camera 404 may be used alone or together to assess relative grass health or grass stress due, for example, to lack of water or nutrients. When visible light camera 404 is used along with a second camera to generate stereoscopic images, the two or more cameras may be set with different exposure settings to provide improved performance over a range of lighting conditions.

Visible light camera 404 may also be a video camera that captures and records images. As a result, visible light camera 404 may be a component in a video-based object recognition system. The video-based object recognition system uses shape recognition to trigger alerts when a target is matched.

One capability provided by video system monitoring of an area, such as area 118 in FIG. 1, is large obstacle detection, which may delay a scheduled task or may adjust the zone of the scheduled task in response to new dynamic objects, such as children or pets, entering the area. Further, the video-based object recognition system may be used to verify that the service robot is operating in the correct section of the yard when scheduled. Furthermore, infrared images provided by infrared camera 402 and images provided by visible light camera 404 may be processed using means known in the art to identify vegetation species and assess vegetation health.

Soil moisture sensor 406 detects the current in situ soil moisture from specific portions of the operating environment. Rain sensor 408 detects precipitation on an exterior surface of the service robot. Temperature sensor 410 detects the ambient temperature of the operating environment. Wind sensor 412 detects the wind speed in the operating environment. Ambient light sensor 414 measures the amount of ambient light in the operating environment.

In one illustrative embodiment, one or more of sensors 408-414 may be located on a charging station, such as charging station 304 in FIG. 3, instead of on the service robot. Alternatively, one or more of sensors 408-414 may be located separate from both the mobile service robot machine and the charging station, yet near enough to the operating environment so as to provide sufficiently accurate data. In addition, one or more of these sensors, such as temperature sensor 410 and wind sensor 412, may be optional features of sensor system 400. Also, a communications unit, such as communications unit 320 in FIG. 3, may transmit data obtained by one or more of these sensors to an online database, such as storage 108 in FIG. 1.

The mobile service robot machine may use GPS sensor 416 to identify the location of the mobile service robot machine with respect to other objects in the operating environment. GPS sensor 416 may be any type of radio frequency triangulation scheme based on signal strength and/or time. Examples include, without limitation, the Global Positioning System, Glonass, Galileo, and cell phone tower relative signal strength. Position is typically reported as latitude and longitude with an error that depends on factors, such as condition of the ionosphere, satellite constellation, and signal attenuation from vegetation.

Structured light sensor 418 emits light in a pattern, such as one or more lines, reads back the reflections of the light pattern through a camera, and interprets the reflections to detect and measure objects in an operating environment. For example, the machine controller may use structured light sensor 418 to measure the vegetation spatial density within the operating environment, which the machine controller may use to determine vegetation quantity. In addition, the mobile service robot machine may use structured light sensor 418 to detect obstacles or objects in the operating environment.

Boundary sensor 420 detects a boundary marker, such as area boundary marker 120 in FIG. 1. The boundary marker may, for example, be a wire placed on or in the soil which marks the boundary of the area for service robot task performance. The mobile service robot machine uses boundary sensor 420 to alert the machine controller that the service robot is exiting or is about to exit the designed task performance area.

Further, boundary sensor 420 may be adapted from the boundary wire detection role to also include a capacitive sensing role capable of measuring soil moisture because the soil dielectric constant changes with water content. This capacitive sensing role may also be capable of detecting non-grass landmarks, such as stepping stones, patios, sidewalks, and the like, for map matching, boundary identification, etc. Moreover, sensor system 400 may transmit this in situ soil moisture data back to a server, such as server 106 in FIG. 1, which may be located in a smart house to assist the server in determining when an irrigation system, such as irrigation system 114 or irrigation system 116 in FIG. 1, is to apply a substance, such as water, to the vegetation in the operating environment.

The machine controller controls application of the substance to the vegetation using data obtained via one or more sensors in sensor system 400. For example, the machine controller directly measures the height of the vegetation in the operating environment using structured light sensor 418 and/or vegetation height sensor 424 located on the service robot. Then, the machine controller compares the measured height of the vegetation with a calculated height of the vegetation and adjusts the amount of the substance applied by an irrigation system to the vegetation in the operating environment based on the difference between the measured height of the vegetation and the calculated height of the vegetation.

In other words, the machine controller increases the amount of the substance applied by the irrigation system to vegetation in response to the measured height of the vegetation being less than the calculated height of the vegetation. In addition, the machine controller decreases the amount of the substance applied by the irrigation system to the vegetation in response to the measured height of the vegetation being greater than the calculated height of the vegetation. The calculated height of the vegetation may, for example, be a predicted height of the vegetation based on known vegetation growth models, a desired height of the vegetation based on user preference, or a deviation from a value calculated from the measured height of the vegetation. The value calculated from the measured height of the vegetation, which is used as the basis of the deviation, may, for example, be an average of the measured height of the vegetation, a median of the measured height of the vegetation, a percentile of the measured height of the vegetation, or a multiple of a standard deviation of the measured height of the vegetation.

The mobile service robot machine may use mobility sensors 422 to safely and efficiently guide the mobile service robot machine through the designated task performance area(s). Mobility sensors 422 may, for example, include an odometer, a compass for dead reckoning, vision and ultrasonic sensors for obstacle/object detection, and/or any other suitable sensor.

The mobile service robot machine may use vegetation height sensor 424 to directly measure the vegetation height within the operating environment. The mobile service robot machine may use this vegetation height data alone, or in conjunction with data obtained from structured light sensor 418, to determine the vegetation quantity. Vegetation height sensor 424 may, for example, be a mechanical sensor, an electrical sensor, an optical sensor, or any combination thereof.

Sensor system 400 is a set of sensors that collect data and information about the operating environment around the mobile service robot machine, as well as the condition of the vegetation in the area of task performance. In these examples, a set refers to one or more items. Thus, a set of sensors refers to one or more sensors in these examples.

Figure 5:
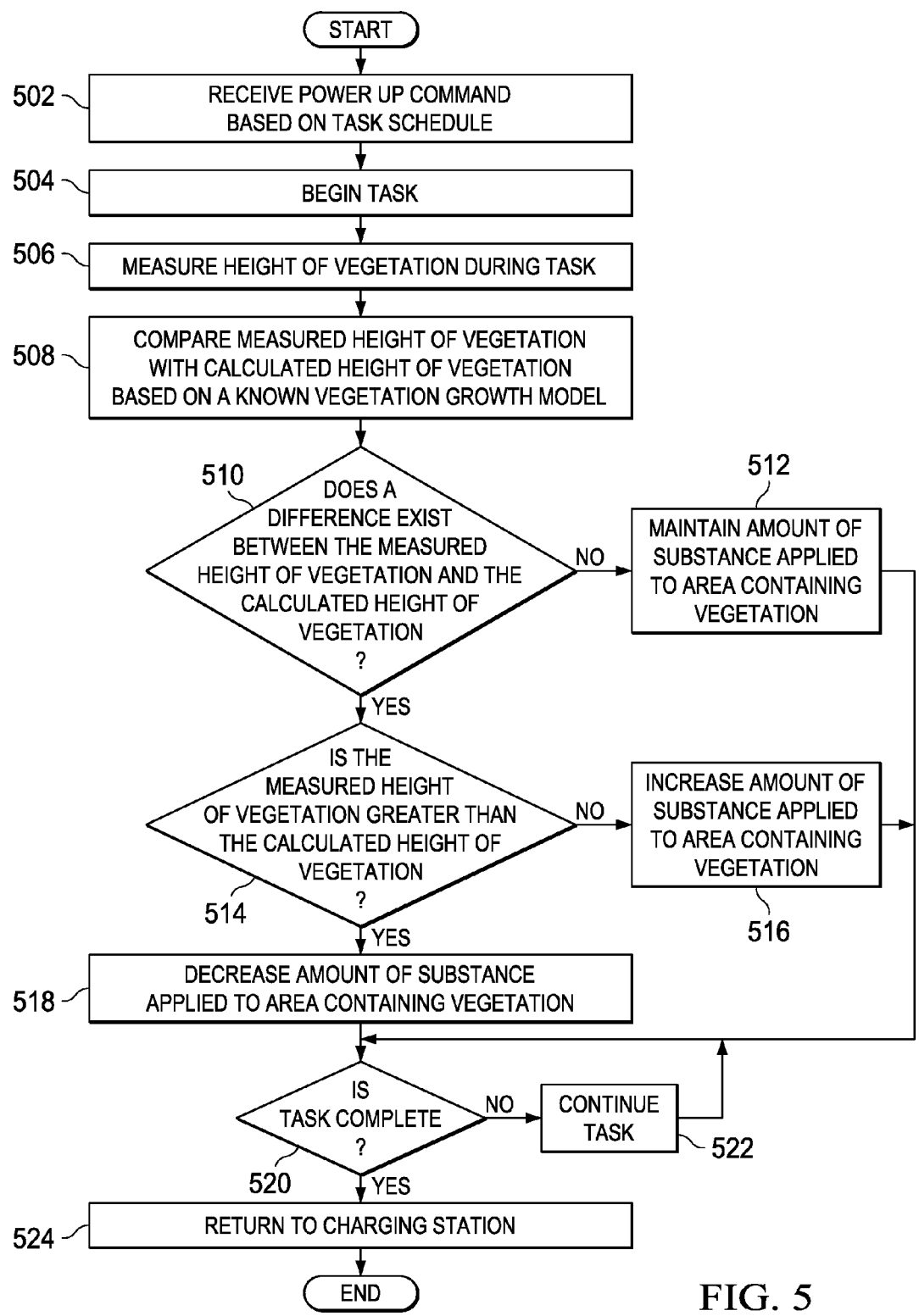
FIG. 5 is a flowchart illustrating an exemplary process for adaptively adjusting an amount of substance applied by an irrigation system in accordance with an illustrative embodiment.

With reference now to FIG. 5, a flowchart illustrating an exemplary process for adaptively adjusting an amount of substance applied by an irrigation system is shown in accordance with an illustrative embodiment. The process shown in FIG. 5 may be implemented in a mobile machine system, such as mobile machine system 300 in FIG. 3.

The process begins when the mobile machine system receives a power up command based on a task schedule, such as task schedule 334 in FIG. 3 (step 502). After receiving the power up command in step 502, the mobile machine system begins a task, such as mowing grass or other type of vegetation (step 504). In addition, the mobile machine measures the height of the vegetation in the area, such as area 118 in FIG. 1, during the task (step 506).

The mobile machine may indirectly measure the height of the vegetation by monitoring the current power usage of a task payload system, such as task payload system 316 in FIG. 3, utilizing a monitoring system, such as monitoring system 318 in FIG. 3. In addition to or instead of using the monitoring system, the mobile machine may directly measure the height and/or spatial density of the vegetation in the area using a set of sensors within a sensor system, such as sensor system 400 in FIG. 4, located on the mobile machine. The sensor system may estimate the height and/or spatial density of the vegetation by using a vegetation height sensor and/or a structured light sensor, such as vegetation height sensor 424 and structured light sensor 418 in FIG. 4.

Then, the mobile machine uses a machine controller, such as machine controller 306 in FIG. 3, to compare the measured height of vegetation in the area with a calculated height of vegetation in the area (step 508). The calculated height of the vegetation in the area may, for example, be based on a known vegetation growth model. In addition, the calculated height of the vegetation is calculated prior to performing the task.

Subsequently, the machine controller makes a determination as to whether a difference exists between the measured height of the vegetation and the calculated height of the vegetation (step 510). However, it should be noted that the difference between the measured height of the vegetation and the calculated height of the vegetation may be within a predetermined acceptable range and not just an exact match. If a difference does not exist between the measured height of the vegetation and the calculated height of the vegetation, no output of step 510, then the machine controller maintains the amount of substance applied by an irrigation system, such as irrigation system 114 in FIG. 1, to the area containing the vegetation (step 512). The substance applied by the irrigation system to the vegetation in the area may, for example, be water, fertilizer, pesticide, herbicide, or any combination thereof. The process proceeds to step 520 thereafter.

If a difference does exist between the measured height of the vegetation and the calculated height of the vegetation, yes output of step 510, then the machine controller makes a determination as to whether the measured height of the vegetation is greater than the calculated height of the vegetation (step 514). If the measured height of the vegetation is not greater than the calculated height of the vegetation, no output of step 514, then the machine controller increases the amount of substance applied by the irrigation system to the area containing the vegetation (step 516). The process proceeds to step 520 thereafter.

If the measured height of vegetation is greater than the calculated height of the vegetation, yes output of step 514, then the machine controller decreases the amount of substance applied by the irrigation system to the area containing the vegetation (step 518). It should be noted that adjusting the irrigation system schedule may also include modifying the amount of time between irrigation operations. For example, the machine controller may increase the amount of time between irrigation operations in response to the measured height of the vegetation in the area being greater than the calculated height of the vegetation. Also, the machine controller may decrease the amount of time between irrigation operations in response to the measured height of the vegetation in the area being less than the calculated height of the vegetation.

Further, the machine controller makes a determination as to whether the task is complete (step 520). The machine controller may determine that the task is complete by, for example, expiration of a default or learned task time limit or by precise area localization provided by dead reckoning, GPS, and/or visual triangulation.

If the task is not complete, no output of step 520, then the machine controller directs the mobile machine to continue the task (step 522). Thereafter, the process returns to step 520 where the machine controller continues to monitor whether the task is complete. If the task is complete, yes output of step 520, then the machine controller directs the mobile machine to return to a charging station, such as charging station 304 in FIG. 3 (step 524). The process terminates thereafter.

However, it should be noted that the mobile machine may return to the charging station one or more times prior to completion of the task if the mobile machine's battery charge level is approaching a predetermined threshold level. For example, the machine controller may activate return to charging station behavior at twenty-five percent charge remaining in the battery with a target charge remaining at return to the charging station between five and ten percent. If the actual charge remaining upon return to the charging station was less than five percent, say for example three percent, the machine controller may increase the return to charging station behavior activation level to thirty percent from the twenty-five percent level. Also, depending on the randomness of the path taken by the mobile machine to the charging station upon return-to-charging station behavior activation, the mobile machine may filter the actual charge value at the charging station upon return over some predetermined number of returns.

The machine controller utilizes a more sophisticated filtering and adjustment process, which takes into account the statistical distribution of actual remaining charge at return so that the charge upon activation of the return-to-charger behavior is at a level that ensures a set statistical probability, such as, for example, ninety-nine percent, that the mobile machine will make it back to the charging station. Further, the machine controller may use ambient air temperature data to adjust the return-to-charger behavior trigger as ambient air temperature impacts effective battery capacity. The machine controller may use a temperature sensor, such as temperature sensor 410 in FIG. 4, to determine the ambient air temperature during the task. Alternatively, the machine controller may use a download module, such as download module 324 in FIG. 3, to wirelessly download temperature data from an online weather service server via a network, such as network 102 in FIG. 1.

Moreover, the machine controller may also utilize topographic information to adjust the return-to-charger behavior trigger. For example, the mobile machine may use more power going uphill and less power going downhill. The machine controller may utilize a horticultural knowledge base and/or a sensor system, such as horticultural knowledge base 326 and sensor system 314 in FIG. 3, to determine the topographical features in the area of task performance.

Thus, the machine controller may adaptively and automatically adjust the irrigation system schedule based on the height of the vegetation in the operating environment as sensed by a set of sensors on the mobile machine. However, it should be noted that the adjustment to the irrigation system schedule may be to the entire area of task performance or only to a portion of that area. Based on site-specific vegetation growth measurements, the machine controller may direct the irrigation system to apply one or more substances in areas with least vegetation growth for a longer period of time or more frequently. The irrigation schedule may at least be partially or wholly derived from a default irrigation schedule, a user input irrigation schedule, and/or a learned irrigation schedule.

Figure 6:
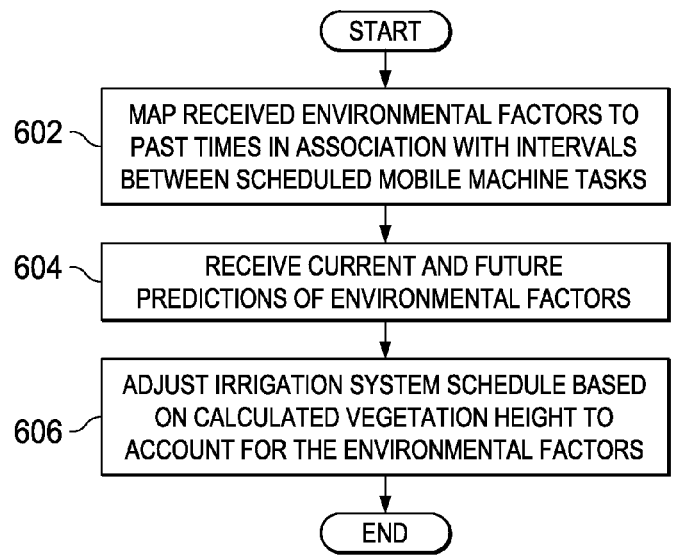
FIG. 6 is a flowchart illustrating an exemplary process for adaptively adjusting an irrigation system schedule based on calculated vegetation height to account for environmental factors in accordance with an illustrative embodiment.

With reference now to FIG. 6, a flowchart illustrating an exemplary process for adaptively adjusting an irrigation system schedule based on calculated vegetation height to account for environmental factors is shown in accordance with an illustrative embodiment. The process shown in FIG. 6 may be implemented in a machine controller, such as machine controller 306 in FIG. 3.

The process begins when the machine controller maps received environmental factors, such as rainfall amounts and temperature, to past times in association with intervals between scheduled mobile machine tasks (step 602). In addition, the machine controller receives current and future forecasts of these environmental factors (step 604). Then, the machine controller adjusts a schedule for an irrigation system, such as irrigation system 116 in FIG. 1, based on a calculated vegetation height to account for these environmental factors (step 606). The process terminates thereafter.

Thus, illustrative embodiments provide a method and system for adaptively varying irrigation system scheduling based data obtained by a mobile service robot machine. The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A mobile machine comprising:
a task payload system;
a propulsion system;
a steering system;
a braking system;
a sensor system for collecting data regarding an operating environment for the mobile machine;
a monitoring system; and
a machine controller coupled to the task payload system, the propulsion system, the steering system, the braking system, the sensor system, and the monitoring system; wherein the machine controller measures a height of the vegetation during a scheduled task of the mobile machine, compares the measured height of the vegetation with a calculated height of the vegetation, and adjusts an amount of the substance applied by an irrigation system to an area containing the vegetation based on a difference between the measured height of the vegetation and the calculated height of the vegetation, wherein the machine controller decreases the amount of the substance applied by the irrigation system to the area containing the vegetation in response to the measured height of the vegetation being greater than the calculated height of the vegetation.

2. A mobile machine comprising:
a task payload system;
a propulsion system;
a steering system;
a braking system;
a sensor system for collecting data regarding an operating environment for the mobile machine;
a monitoring system; and
a machine controller coupled to the task payload system, the propulsion system, the steering system, the braking system, the sensor system, and the monitoring system; wherein the machine controller measures a height of the vegetation during a scheduled task of the mobile machine, compares the measured height of the vegetation with a calculated height of the vegetation, and adjusts an amount of the substance applied by an irrigation system to an area containing the vegetation based on a difference between the measured height of the vegetation and the calculated height of the vegetation, wherein the substance is a liquid.

3. The mobile machine of claim 2, wherein the liquid is at least one of water, fertilizer, pesticide, fungicide, nematicide, and herbicide.

4. A mobile machine comprising:
a task payload system;
a propulsion system;
a steering system;
a braking system;
a sensor system for collecting data regarding an operating environment for the mobile machine;
a monitoring system; and
a machine controller coupled to the task payload system, the propulsion system, the steering system, the braking system, the sensor system, and the monitoring system; wherein the machine controller measures a height of the vegetation during a scheduled task of the mobile machine, compares the measured height of the vegetation with a calculated height of the vegetation, and adjusts an amount of the substance applied by an irrigation system to an area containing the vegetation based on a difference between the measured height of the vegetation and the calculated height of the vegetation, wherein the calculated height of the vegetation is at least one of a predicted height of the vegetation, a desired height of the vegetation, and a deviation from a value calculated from the measured height of the vegetation.

5. The mobile machine of claim 4, wherein the value calculated from the measured height of the vegetation used as the basis of the deviation is at least one of an average of the measured height of the vegetation, a median of the measured height of the vegetation, a percentile of the measured height of the vegetation, and a multiple of a standard deviation of the measured height of the vegetation.

6. A mobile machine comprising:
a task payload system;
a propulsion system;
a steering system;
a braking system;
a sensor system for collecting data regarding an operating environment for the mobile machine;
a monitoring system; and
a machine controller coupled to the task payload system, the propulsion system, the steering system, the braking system, the sensor system, and the monitoring system; wherein the machine controller measures a height of the vegetation during a scheduled task of the mobile machine, compares the measured height of the vegetation with a calculated height of the vegetation, and adjusts an amount of the substance applied by an irrigation system to an area containing the vegetation based on a difference between the measured height of the vegetation and the calculated height of the vegetation, wherein the machine controller maps received environmental factors to past times in association with intervals between scheduled tasks of the mobile machine, receives current and future predictions of environmental factors, and adjusts a schedule of the irrigation system based on a calculated vegetation height to account for the environmental factors, wherein the mobile machine is aware of the schedule of the irrigation system; and wherein the machine controller adjusts the schedule of the irrigation system based on non-optically sensed changes in vegetation height by the mobile machine.

* * * * *